US007080857B2

(12) United States Patent
Patton et al.

(10) Patent No.: US 7,080,857 B2
(45) Date of Patent: Jul. 25, 2006

(54) AUTHENTICATION USING NEAR-FIELD OPTICAL IMAGING

(75) Inventors: David L. Patton, Webster, NY (US); John P. Spoonhower, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/601,800

(22) Filed: Jun. 23, 2003

(65) Prior Publication Data

US 2004/0007869 A1 Jan. 15, 2004

Related U.S. Application Data

(63) Continuation of application No. 09/920,972, filed on Aug. 2, 2001, now Pat. No. 6,722,699.

(51) Int. Cl.
*B23B 1/15* (2006.01)

(52) U.S. Cl. ........................... 283/60; 283/70; 283/72; 283/901

(58) Field of Classification Search .................. 283/60, 283/70, 72, 76, 91, 67, 74, 75, 17, 901; 235/462.01, 235/462.03, 462.04
See application file for complete search history.

(56) References Cited

U.S. PATENT DOCUMENTS

| | | | | |
|---|---|---|---|---|
| 4,186,943 | A * | 2/1980 | Lee | 283/91 |
| 4,634,220 | A | 1/1987 | Hockert et al. | |
| 4,763,928 | A * | 8/1988 | Krietemeier et al. | 283/70 |
| 5,126,256 | A | 6/1992 | Ebeling et al. | |
| 5,139,812 | A * | 8/1992 | Lebacq | 427/7 |
| 5,272,330 | A | 12/1993 | Betzig et al. | |
| 5,429,392 | A * | 7/1995 | Loving | 283/72 |
| 5,500,331 | A | 3/1996 | Czekai et al. | |
| 5,662,279 | A | 9/1997 | Czekai et al. | |
| 5,718,388 | A | 2/1998 | Czekai et al. | |
| 5,974,150 | A | 10/1999 | Kaish et al. | |
| 6,155,605 | A | 12/2000 | Bratchley et al. | |
| 6,195,452 | B1 * | 2/2001 | Royer | 382/135 |

OTHER PUBLICATIONS

"Imaging with Solid Immersion Lenses, Spatial Resolution, and Applications", Qiang Wu, Luke P. Ghislain, V. B. Elings, Proceedings of the IEEE, vol. 88, No. 9, Sep. 2000, pp. 1491-1498.

* cited by examiner

*Primary Examiner*—Willmon Fridie, Jr.
(74) *Attorney, Agent, or Firm*—Thomas J. Strouse

(57) ABSTRACT

A discrete micro particle having a micro image, a method of making discrete micro particles and use in authentication of products. The micro images are printed on a photo sensitive layer on a media and the media is ground into small discrete particles on which the micro images can be viewed for verification of the authenticity of a product on which the micro particles have been placed.

12 Claims, 8 Drawing Sheets

AUTHENTICATION USING NEAR-FIELD OPTICAL IMAGING

CROSS REFERENCE TO RELATED APPLICATIONS

This is a Continuation application of U.S. Ser. No. 09/920,972; filed Aug. 2, 2001 now U.S. Pat. No. 6,722,699; of David L. Patton and John P. Spoonhower, entitled "Authentication Using Near Field Optical Imaging".

FIELD OF THE INVENTION

This invention relates to an article, system and method used for creating an identification marker in the form of an image used for authentication of documents.

BACKGROUND OF THE INVENTION

Recent advances in optics provide for a method of exposure of materials on a length scale much smaller than previously realized. Such near-field optical methods are realized by placing an aperture or a lens in close proximity to the surface of the sample or material to be exposed. Special methods for positioning control of the aperture or lens are required, as the distance between the optical elements (aperture or lens) is extremely small. Betzig and Trautman in U.S. Pat. No. 5,272,330 reported on the use of tapered optical fibers as a means of providing exposures in extremely small areas; exposures of the size of 10 nm in area are now relatively commonplace. In this case, the fiber tip position is maintained to be within some nanometers (typically 10–50) of the target surface. Others (see, for example, the review by Q. Wu, L. Ghislain, and V. B. Elings, Proc. IEEE (2000), 88(9), pg. 1491–1498) have developed means of exposure by the use of the solid immersion lens (SIL). The SIL is positioned within approximately 0.5 micrometer of the target surface by the use of special nano-positioning technology as in the case of the tapered optical fiber. SIL technology offers the advantage that the lens provides a true imaging capability, i.e. features in a real object can be faithfully rendered in an image of reduced spatial extent. In the case of the SIL images can be produced much smaller than the image size achievable through the use of conventional or classical optics. Such conventional optics are said to be diffraction-limited because the size of the smallest feature in an image is limited by the physical diffraction. Exposures produced by means of the SIL or other near-field optical methods can be much smaller in spatial extent than those produced by conventional optical systems and still be readable. Near-field optics have been used to create single dots and used to capture images not capable of being captured using a conventional optical microscope. The prior art does not teach forming an entire image using near-field optics. Such near-field technology is used in the present invention to provide a means of exposure to be used in the production of small images and to use these images as indicia for the purpose of authentication.

SUMMARY OF THE INVENTION

In accordance with one aspect of the present invention there is provided a method of making an authentication product, comprising the steps of:

providing a first product, applying a plurality of micro discrete image products, each of the micro discrete image products having a predetermined image thereon.

In accordance with yet another aspect of the present invention there is provided a product having a plurality of micro discrete particles placed thereon, the particles having a size no greater than about 20 microns and having at least a portion of a micro image placed thereon, the micro image having a size no greater than about 20 microns.

In still another aspect of the present invention there is provided a micro discrete particle having a size no greater than about 20 microns and having photosensitive layer on which at least a portion of a micro image is formed thereon, the micro image having a size no greater than about 20 microns.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The invention has been described in detail with particular reference to certain preferred embodiments thereof, but it will be understood that variations and modifications can be effected within the spirit and scope of the invention.

The method comprises creation of a discrete image using near-field optics. The method also comprises creation of a discrete identification indicia (image) using near-field optics by imaging a plurality of unique indicia onto a medium. The medium is ground to form discrete identification particles. The size of each identification particle being 2 to 20 microns contains the indicia or a portion of the indicia. The particles having the indicia are applied to an article. The method of identifying includes scanning or optically viewing the article and viewing the identification particles imprinted with the indicia. The identification indicia may be used for a variety of purposes. For example, the identification indicia can be used to identify a property or characteristic of the article upon which they are placed. Alternatively, the identification indicia parts are well suited for authentication of the article. For example, the article is genuine and/or comes from a particular source.

Figure 1A:
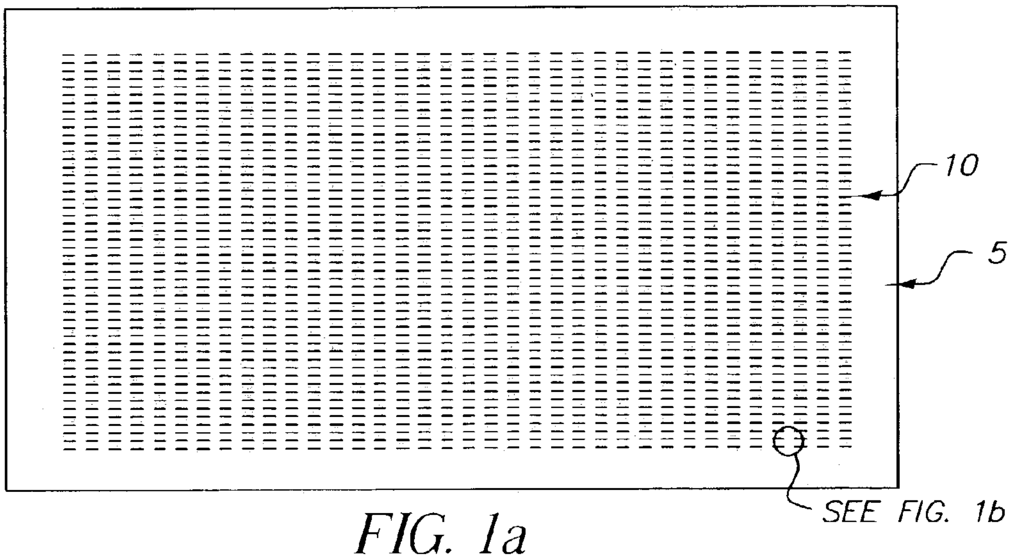
FIG. 1*a* is a plan view of a sheet of medium made in accordance with the present invention containing identification images of unique indicia.
Figure 1B:
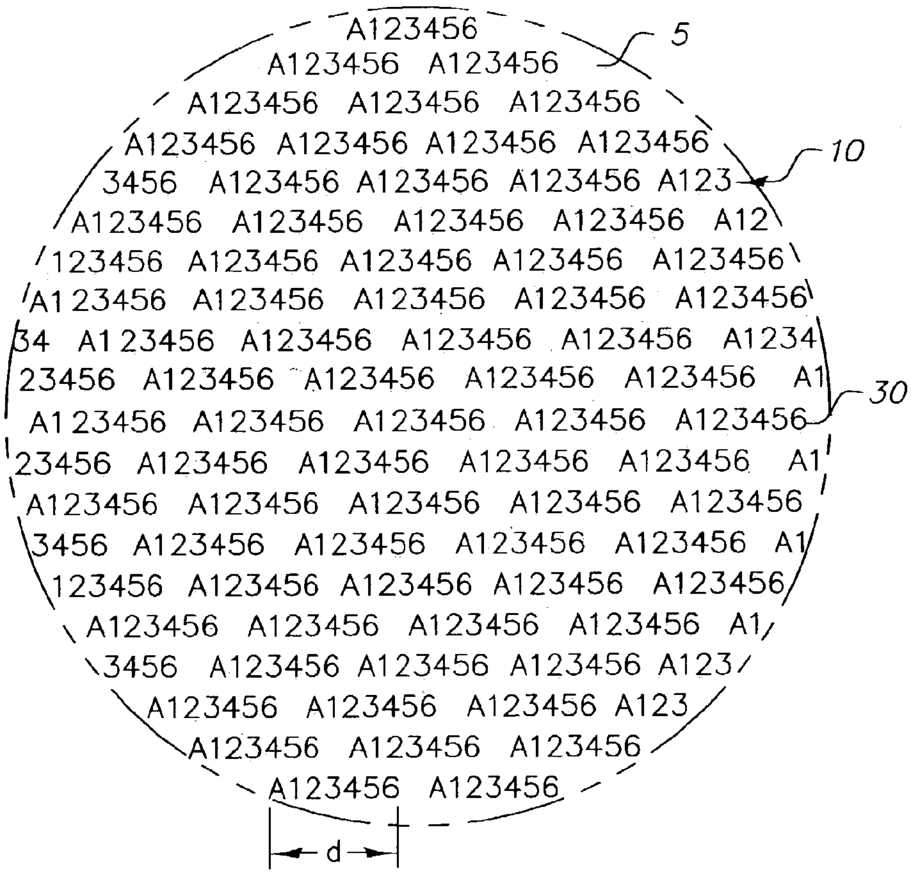
FIGS. 1*b*, 1*c*, 1*d*, and 1*e* are an enlarged partial view of a portion of the sheet of medium of FIG. 1 illustrating a variety of identification images.
Figure 1C:
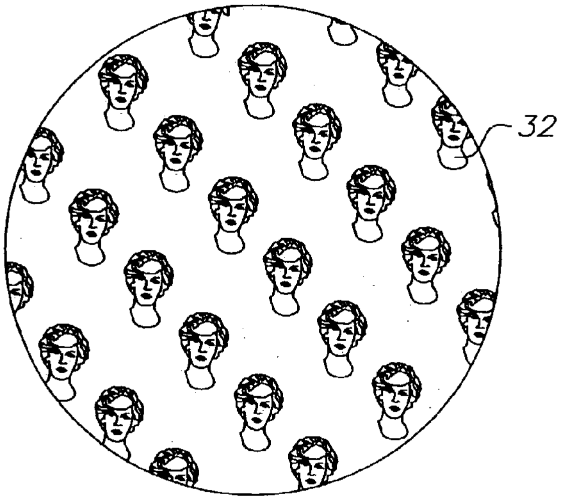
Figure 1D:
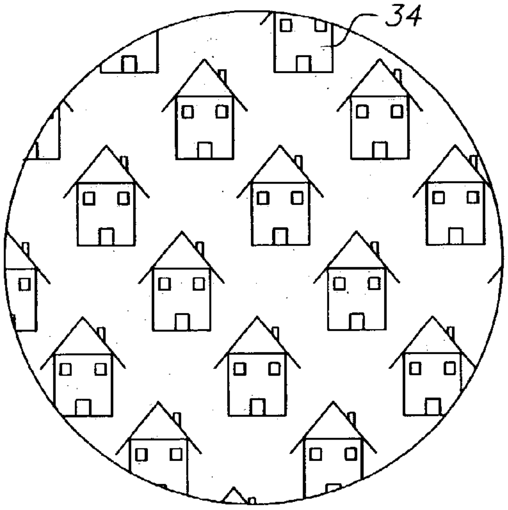
Figure 1E:
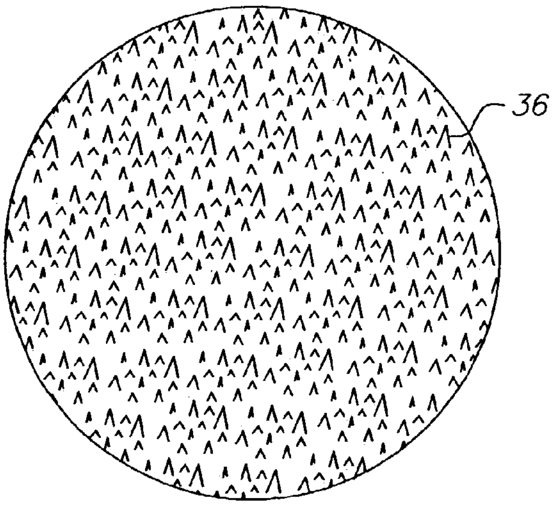

Referring to FIG. 1*a*, there is illustrated a plan view of a sheet of medium 5 containing a plurality of identification images of indicia 10 shown in an enlarged plan view in FIG. 1*b*. Preferably the length "d" of the indicia (image) 10 is no greater than 10 microns. The indicia 10 can be of such a size that can be read when placed on the article but not detract from the original appearance of the article on which it is placed as viewed under normal viewing conditions. A plurality of identification images are imaged onto the media 5 using near-field optics, which will be explained later in FIG. 3. The indicia 10 can be an alphanumeric 30, an image of a person 32, place or thing 34, or an image of a characteristic 36 of the article such as texture as shown in FIGS. 1*b*, 1*c*, 1*d*, and 1*e* respectively. If an alphanumeric is used as the micro image, this can also be used as a serial number and/or code for use in further authenticating the article or providing additional information directly from the alphanumeric or be used to look up information from a database.

Figure 2A:
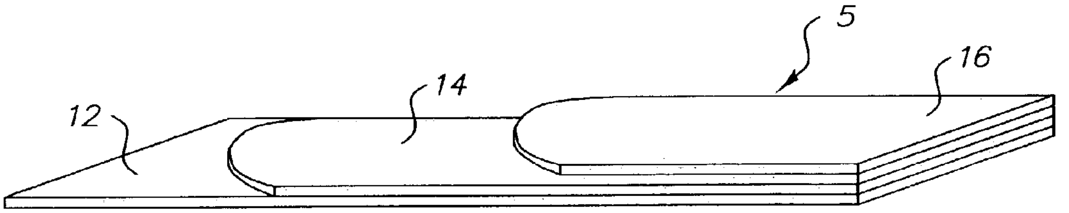
FIG. 2*a* is a perspective view of a medium having identification indicia of FIGS. 1*a* and 1*b;*

Referring to FIG. 2*a*, there is illustrated a perspective view of the medium 5 used for forming identification indicia of FIGS. 1*a*, 1*b*, 1*c*, 1*d* and 1*e*. The medium 5 comprises a support layer 12. In the particular embodiment illustrated, the support layer 12 is polyester, for example Estar, and has a thickness of approximately 1 mil (0.025 mm.). Over the support layer 12 there is provided a release layer 14 such as hydroxyethylcellulous and polyvinyl butyral and has a thickness of approximately 0.5 to 1.0 microns (0.0005 mm to 0.001 mm). While in the embodiment illustrated, the release layer 14 is provided; the imaging layer 16 can be coated directly onto the support layer 12. In the particular embodiment illustrated, the imaging layer 16 is a dye, for example, metallized phthalocyanine and has a thickness of approximately 100–1000 nanometers (0.0001 mm to 0.001 mm).

Figure 2B:
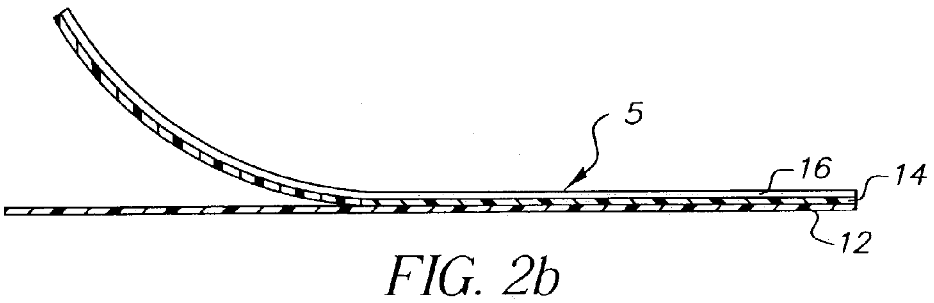
FIG. 2*b* is a cross-sectional view of the medium of FIG. 2*a* illustrating the peel able nature of the invention.

Referring to FIG. 2*b*, there is illustrated a cross-sectional view of the medium 5. The use of the release layer 14 allows the imaging layer 16 to be peeled from the support layer 12. In cases where the support layer 12 is a rigid plastic, for example polycarbonate, separating the imaging layer 16 from the support layer is advantageous for producing small particle sizes as discussed later on. In the embodiment where the support layer 12 is a flexible material such as Estar or acetate the imaging layer 16 does not need to be separated from the support layer 12.

Figure 2C:
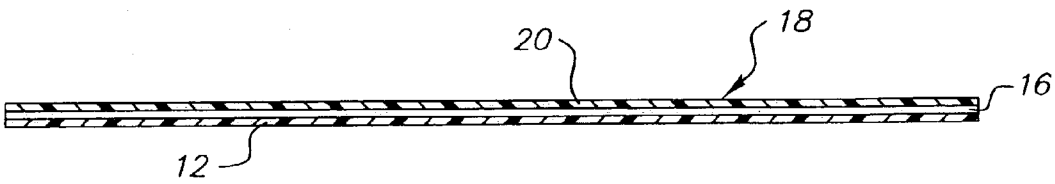
FIG. 2*c* is a cross-sectional view of another modified medium made in accordance with the present invention.

Referring to FIG. 2*c*, there is illustrated a modified medium 18 made in accordance with the present invention. Medium 18 is similar to medium 5, like numerals indicating like elements and function. In this embodiment a clear protective layer 20 is applied over the imaging layer 16 to protect the imaging layer 16 from dirt, dust, and scratches. The protective layer 20 can be applied at manufacture and removed prior to the printing process and then reapplied after the printing process. The protective layer 20, for example can be a thin Mylar of approximately 1 micron or less thickness or can be a clear toner applied after the printing process.

Figure 3:
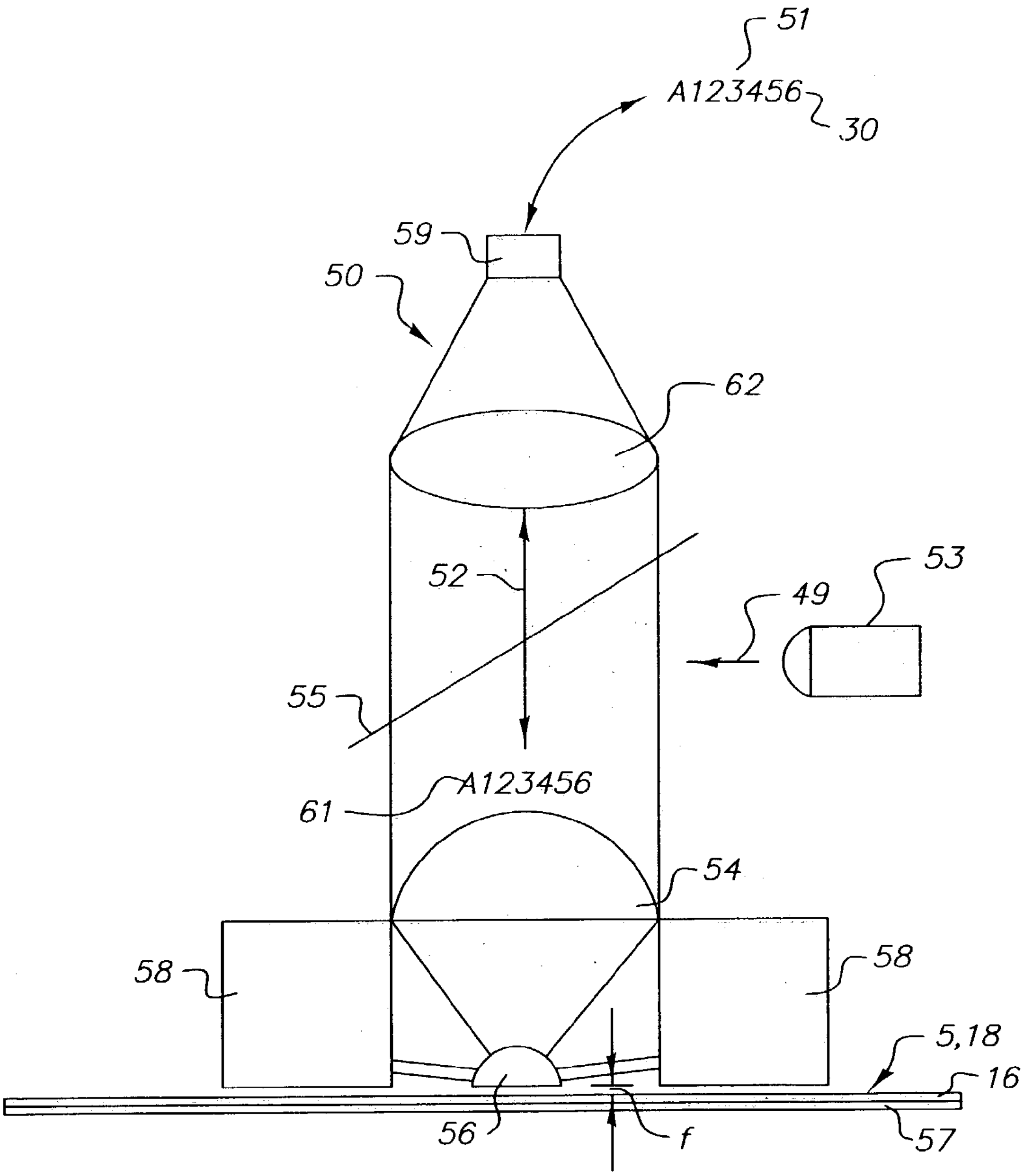
FIG. 3 is a schematic view of an apparatus for printing the various indicia on the media of FIG. 1*b* using near-field optics.

Referring now to FIG. 3, there is illustrated an apparatus 50 for forming indicia 10 on medium 5 or 18. The object 51 is a macroscopic representation of the indicia 30 to be formed on medium 5 or 18. An image 61 is created in the imaging layer 16 by transferring light from the object 51. The light beam 49 from a light source 53 reflects from a beam splitter 55, through a lens system 62, reflects off the object 51 and passes through an objective lens 54 of conventional design and impinges onto a solid immersion lens (SIL) 56. The medium 5 or 18 resting on a stage 57 is placed within a critical distance f; images formed from such a system will have a lateral spatial resolution that exceeds the diffraction limit as is well known to those skilled in the art. The light beam 52 passes through an objective lens 54 of conventional design and impinges onto a solid immersion lens (SIL) 56. Imaging layer 16 placed within a critical distance f; images formed from such a system will have a lateral spatial resolution that exceeds the diffraction limit as is well known to those skilled in the art. The SIL 56 is positioned within the near-field coupling limit appropriate for the particular lens in use by the use of a positioning device 58.. European Patent No. 1083553 provides an example of the means to position an SIL at the appropriate distance from the recording surface which is incorporated by reference herein. Such a positioning device could be a flying head as is used in hard disk storage devices. Alternately there are many known in the art as nano or micro positioning technologies. The image 61 used to form the identification indicia 10 can be obtained from a variety of sources 59 such as an illuminated object, a negative, print, and/or a softcopy display. The image 61 can be black and white or color. The softcopy display can be a CRT, OLED or other similar type device.

The present embodiment describes a plurality of the same image formed on the sheet of medium 5. In another embodiment of the present invention a plurality of images each image being a different image are formed on the sheet of medium 5. Because the size of the indicia images formed are on the order of 1 to 10 microns the density of the number of images formed in a very small area is greatly increased. The size of the image being formed depends on the resolution and the size of the original to be produced. For example a 4R photographic print (4 inches by 6 inches) can be reduced using near-field optical imaging to an image, which is approximately 0.01 mm by 0.015 mm.

Figure 4:
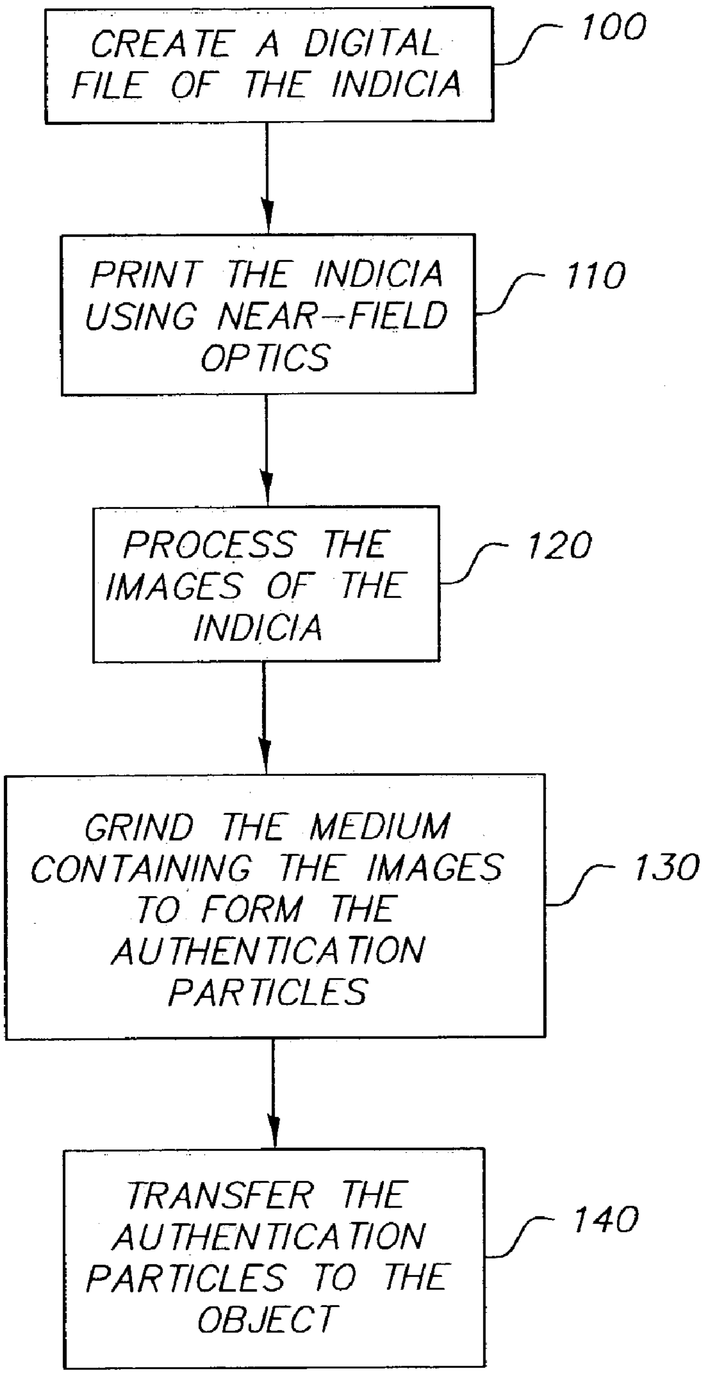
FIG. 4 is a flow chart illustrating the method for making the media of FIG. 1*a;*

Now referring to FIG. 4, there is illustrated a flow chart of the method according to the present invention. The method comprises creation of a digital file of the characteristic 36 image to form the indicia 30 at step 100. Using near-field optics, the image of the indicia 30 is repeatedly printed onto the medium 5 at step 110. The medium 5 is then processed at step 120. After processing, the medium 5 with the image of the indicia 30 is ground (FIG. 5*a*) to form micro discrete identification micro particles 40 at step 130 shown in FIG. 5*b*. The micron-sized identification micro particles 40 containing the image of the indicia 30 or a portion of the image of the indicia are then transferred to the article 48 at step 140 as described in FIGS. 6*a* and 6*b*.

Figure 5A:
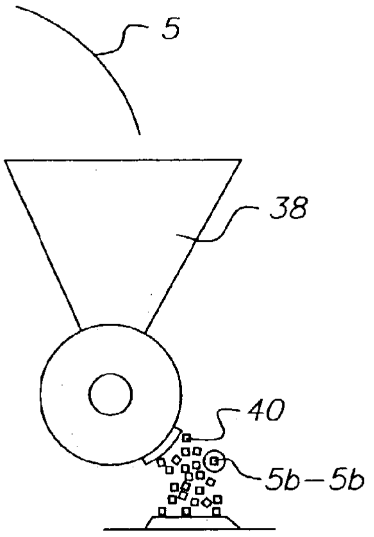
FIG. 5*a* is a schematic view of the grinding of the media of FIG. 1*a* for making discrete identification particles.
Figure 5B:
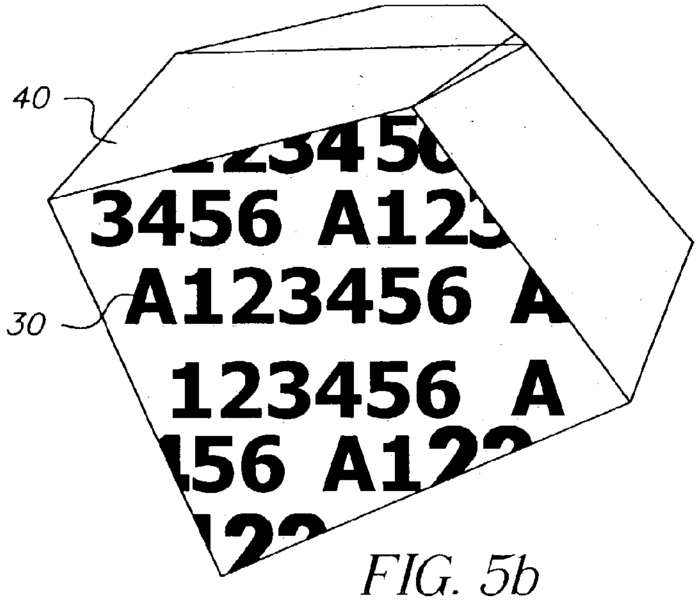
FIG. 5*b* is an enlarged view of a micron-sized particle of FIG. 5*a*, imprinted with an image.
Figure 5C:
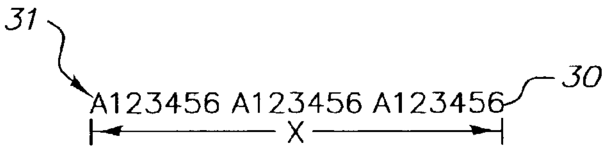
FIG. 5*c* illustrates an indicium that is printed on the media.

Now referring to FIGS. 5*a*, 5*b*, and 5*c* the medium 5 containing the indicia 30 is fed into a grinding device 38. A method used for creating the micron-sized identification micro particles 40 is described in U.S. Pat. Nos. 5,718,388, 5,500,331 and 5,662.279, which are incorporated by reference herein. Each identification particle 40 contains at least one image of the indicia 30 or a portion of the indicia 30, as shown in FIG. 5*b*. Since a large number of identification particles 40 are transferred to the article 48, the image of the indicia 30 and/or portions of the image of the indicia 30 ensure the complete indicia will be discernable. Now referring to FIG. 5*c*, the indicium 30 is printed on the media 5 in a repeating pattern 31. Preferably the length "x" of the printed pattern 31 of the indicia 30 is no greater than 10 microns or the size of the identification particle 40. The length "x" corresponds to the size of the identification particles 40 such that all or a portion of the indicia 30 appears on one or more surfaces of the particle.

Figure 6A:
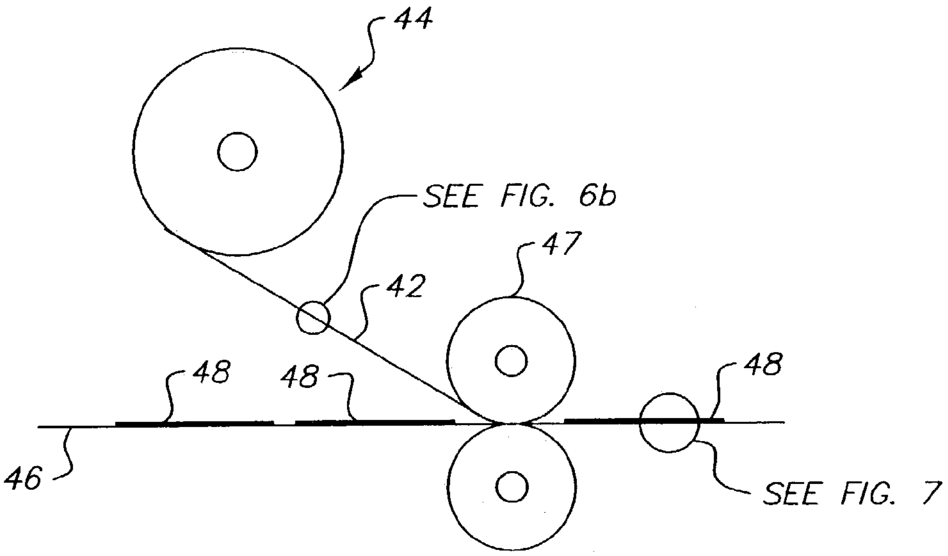
FIG. 6*a* is a schematic view illustrating a method transferring the micron-sized particle to an article.
Figure 6B:
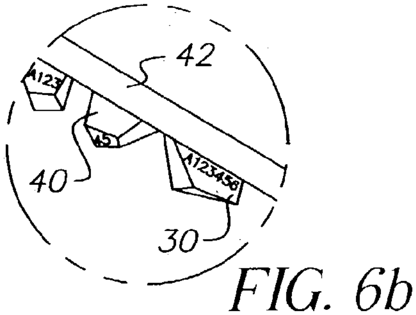
FIG. 6*b* is an enlarged partial view of a the micron-sized particle of FIG. 6*a;*

Referring to FIG. 6*a* , there is illustrated a method for transferring the micron-sized identification particles 40 containing all or a portion of the indicia 30. In the embodiment illustrated the article 48 is currency. However article 48 may be any desired object, for example stock certificates, tickets, clothing, stamps, labels, etc. In the embodiment shown the identification particles 40 are conveyed on a belt 42 via a transport device 44. The articles 48 are conveyed on a belt 46 via a transportation device not shown. The belts 42 and 46 convey the identification particles 40 and the article 48 respectively through a pair of transfer rollers 47 where the micron-sized identification particles 40 are transferred from the belt 44 to the article 48. The number of particles transferred to the article 48 is such that all or a portion of the indicia 30 appears on one or more particles so the entire indicium 30 can readily be identified. The method of transfer can be an electrostatic process similar to the manner toner particles are applied to paper. FIG. 6*b* is an enlarged partial view of the belt 44 and the micron-sized identification micro particles 40 shown in FIG. 6*a*. Other methods of transferring the micron-sized identification micro particles 40 are: creating a slurry and coating the slurry on the article, creating a tape and transferring the micron-sized identification particles 40 using pressure rollers and direct contact, and sprinkling the micron-sized identification micro particles 40 onto the article, or applying an adhesive on the article or the particles. All that is required is that the particles adhere in some manner to the article.

Figure 7:
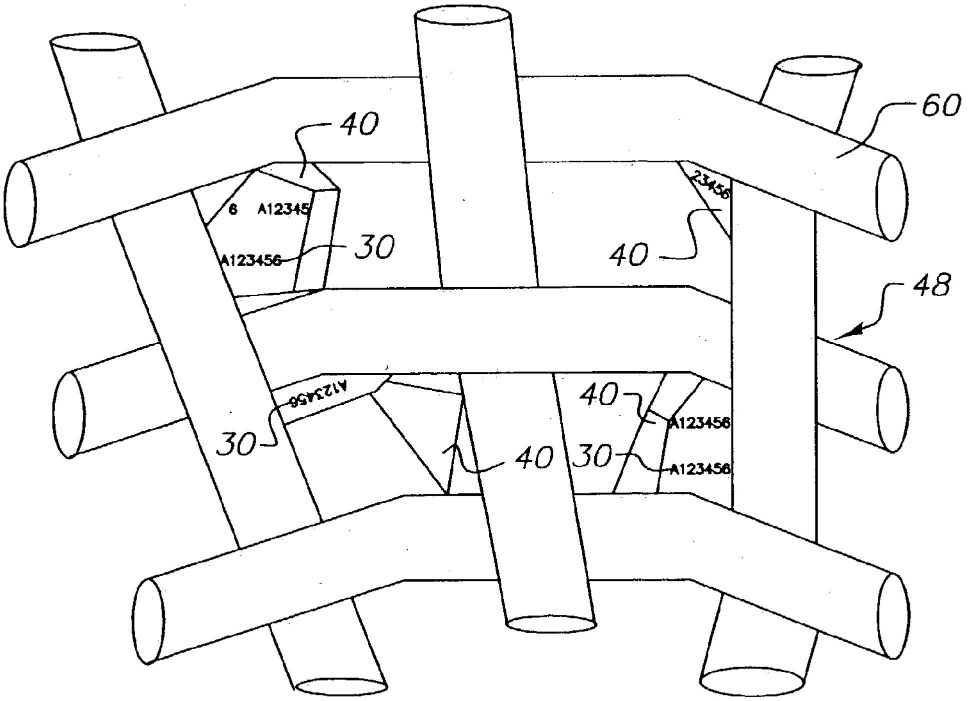
FIG. 7 is an enlarged view illustrating the identification particles adhered to the fibers of the article of FIG. 6*a;*

FIG. 7 illustrates the micron-sized identification particles 40 adhered to the fibers 60 of the article 48, for example currency.

Figure 8:
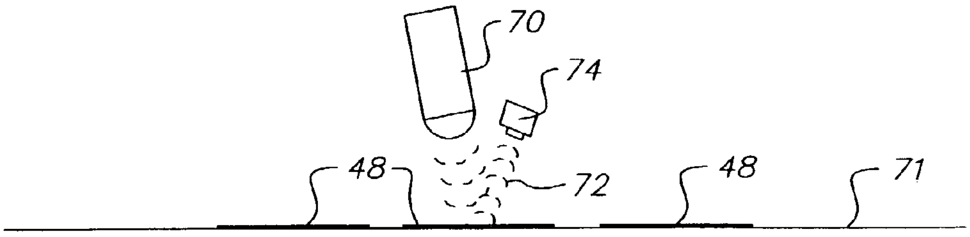
FIG. 8 is a schematic view of an apparatus used for detecting the identification particles located on the article described in FIG. 7.

Referring now to FIG. 8, the identification particles 40 can be detected by scanning or optically viewing the article 48 and discerning the micron-sized identification particles 40 shown in FIG. 5*b* containing the indicia 30. The medium 5 shown in FIGS. 1*a* and 1*b* can include a material such as a fluorescent polymer; for example doped Poly(phenylene vinylene) (PPV) or polyethylene naphthalate (PEN) that fluoresces under certain lighting conditions. The fluorescent material makes it easier to detect whether the micron-sized identification particles 40 have been applied to the article 48. When the article 48 is passed under a light source 70 via a transport mechanism 71, the micron-sized authentication particles 40 fluoresce providing a signal 72 to a detector 74 that indicates the article 48 has been impregnated with the authentication particles 40.

Figure 9B:
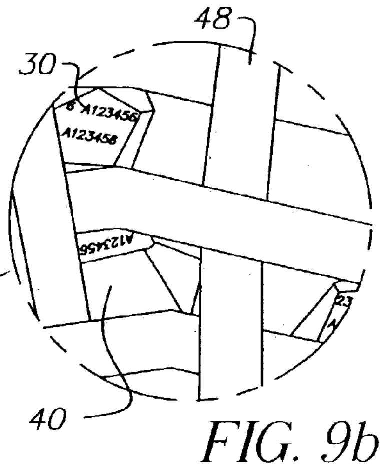
FIG. 9*b* is an enlarged partial view of the image displayed by the apparatus used for viewing the identification particles located on the article described in FIG. 7.
Figure 9A:
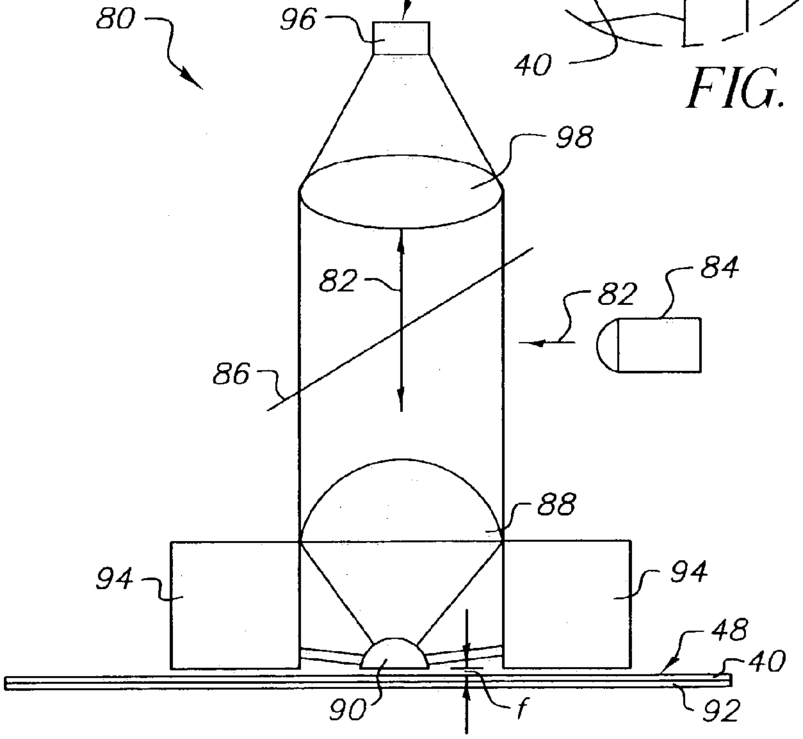
FIG. 9*a* is a schematic view of an apparatus used for viewing the identification particles located on the article described in FIG. 7.

Once it has been determined particles are present, referring now to FIG. 9*a*, the authentication particles 40 on the article 48 can be viewed using magnifying imaging device 80 to capture an image of the indicia 30. The light beam 82 from a light source 84 reflects from a beam splitter 86 and passes through an objective lens 88 of conventional design and impinges onto a solid immersion lens (SIL) 90. Article 48 resting on a stage 92 is placed within a critical distance f; images formed from such a system will have a lateral spatial resolution that exceeds the diffraction limit as is well known to those skilled in the art. The SIL 90 is positioned within the near-field coupling limit appropriate for the particular lens in use by the use of a positioning device 94. Such a positioning device could be a flying head as is used in hard disk storage devices. The light beam 82 is reflected from the article 48, passes through the SIL 90, the objective lens 88, and the beam splitter 86, imaging the authentication particles 40 containing the indicia 30 onto a sensor 96 by a lens system 98.

Referring now to FIG. 9*b*, an enlarged partial view of the image captured by the device 80 is shown. Using the imaging device 80, the image of the authentication particles 40 containing indicia 30 on the article 48 are displayed for viewing for authentication purposes. The size of the identification particles 40 are such that all or a portion of the indicia 30 appears on one or more surfaces of the particle. The identification particles 40 applied to the article 48 are of a size such that they are not visually discernable on the article 48 with the unaided eye under normal viewing conditions or detract from the overall original appearance of the article 48. As previously discussed, the size is preferably no greater than about 20 microns, and is generally in the range of about 2 to 20 microns.

As can be seen from the foregoing the providing of identification particles on products made in accordance with the present invention provides a method for allowing independent verification of the authenticity of a product directly from the product, and also provides a mechanism for preventing and/or minimizing counterfeiting of such products. The invention has been described in detail with particular reference to certain preferred embodiments thereof, but it will be understood that variations and modifications can be effected within the spirit and scope of the invention.

It is to be understood that various changes and modifications made be made with out departing from the scope of the present invention, the present invention being defined by the claims that follow.

PARTS LIST

5 medium sheet
10 indicia
12 support layer
14 release layer
16 imaging layer
18 medium
20 protective layer
30 alphanumeric
31 pattern
32 person
34 place/thing
36 characteristic
38 grinding device
40 identification particles
42 belt
44 transport device
46 belt
47 transfer rollers
48 article
49 light beam
50 apparatus
51 object

52 light beam
53 light source
54 objective lens
55 beam splitter
56 solid immersion lens (SIL)
57 stage
58 positioning device
59 source
60 fibers
70 light source
71 transport mechanism
72 signal
74 detector
80 imaging device
82 light beam
84 light source
86 beam splitter
88 objective lens
90 solid immersion lens (SIL)
92 stage
94 positioning device
96 sensor
98 lens system
100 step
110 step
120 step
130 step
140 step

What is claimed is:

1. A method of making an authentication product, comprising the steps of:

providing a first product, applying a plurality of micro discrete identification particles, each of said micro discrete identification particles applied to said first product and having a size no greater than about 20 microns and having at least one predetermined image thereon, said predetermined image having a size no greater than about 10 microns.

2. The method according to claim 1 wherein said micro discrete identification particles when placed on an article do not detract from the original appearance of the article as viewed under normal viewing conditions.

3. The method according to claim 1 further comprising the step of viewing said first product under magnification so as to view said micro discrete identification particles for identification of said indicia.

4. The method according to claim 1 wherein said predetermined image is formed on a photosensitive media using near-field optics.

5. A product having a plurality of micro discrete identification particles placed thereon, said micro-discrete identification particles having a size no greater than about 20 microns and having at least a portion of a micro image placed thereon, said micro image having a size no greater than about 10 microns.

6. The product according to claim 5 wherein said product comprises any one of the following: stock certificates, tickets, clothing, stamps, financial instruments, and labels.

7. The product according to claim 6 wherein said micro discrete identification particles are applied on said product by applying an adhesive to said product or said micro discrete identification particles and applying said discrete identification particles to said product.

8. The product according to claim 6 wherein said micro discrete identification particles are applied on said product by an electrostatic process.

9. The product according to claim 5 wherein said discrete identification particles includes a photosensitive layer on which said discrete micro image is formed.

10. A micro discrete identification particle having a size no greater than about 20 microns and having photosensitive layer on which at least a portion of a micro image is formed thereon, said micro image having a size no greater than about 20 microns.

11. The micro discrete identification particle according to claim 10 wherein said micro image has a size no greater than about 10 microns.

12. The micro discrete identification particle according to claim 10 wherein said at least a portion of the micro image is repeated a plurality of times on said layer.

* * * * *